United States Patent
Huang

(10) Patent No.: US 8,162,657 B2
(45) Date of Patent: Apr. 24, 2012

(54) DEVICE FOR REMOVING BROKEN RUNNER SYSTEM FROM AN INJECTION MOLD

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 29 days.

(21) Appl. No.: 12/906,128

(22) Filed: Oct. 17, 2010

(65) Prior Publication Data

US 2011/0280980 A1 Nov. 17, 2011

(30) Foreign Application Priority Data

May 11, 2010 (TW) .................................. 99115040 A

(51) Int. Cl.
*B29C 45/42* (2006.01)
(52) U.S. Cl. .................. 425/556; 264/334; 425/DIG. 51
(58) Field of Classification Search .................. 264/334; 425/556, DIG. 116, DIG. 51
See application file for complete search history.

(56) References Cited

U.S. PATENT DOCUMENTS

| 5,421,717 | A * | 6/1995 | Hynds ........................... 425/556 |
| 6,399,006 | B1 * | 6/2002 | Stoick et al. .................. 425/556 |
| 6,599,115 | B2 * | 7/2003 | Chalcraft et al. ............. 425/556 |
| 8,083,978 | B1 * | 12/2011 | Fox et al. ..................... 425/556 |

* cited by examiner

*Primary Examiner* — Timothy Heitbrink
(74) *Attorney, Agent, or Firm* — Altis Law Group, Inc.

(57) ABSTRACT

A removing device includes a fixture, an extendable and retractable arm, a heating rod, and a rotatable head. The fixture includes a top surface, a bottom surface, and a hole extending from the top surface to the bottom surface. The arm is threadedly engaged in the hole. The heating rod is coupled to an end of the arm. The heating rod includes a first portion inserted in the hole and coupled to the arm, and a second portion protruding from the bottom surface. The heater heats the heating rod. The rotatable head is rotatable relative to the fixture to move the heating rod between an extended position and a retracted position. In the extended position, the second portion heats the base material of the broken portion of a runner system. In a retracted position, the broken portion of the lens runner system is moved away from the injection mold.

12 Claims, 2 Drawing Sheets

DEVICE FOR REMOVING BROKEN RUNNER SYSTEM FROM AN INJECTION MOLD

BACKGROUND

1. Technical Field

The disclosure generally relates to injection molding technologies and, particularly, to a device for removing broken runner system from an injection mold.

2. Description of Related Art

Currently, plastic lenses are widely used in consumer electronic products, for example, digital cameras, as they are cheap and simple to manufacture.

In general, when manufacturing the plastic lenses, a runner system including the plastic lenses is formed first by applying an injection molding process, and then the runner system can be pushed out of the injection mold by an ejector mechanism. The plastic lenses can be cut from the runner system. Referring to FIG. 2, a typical runner system 40 is shown. The runner system 40 may include four plastic lenses 42, a sprue 44, and four runners 46. Each of the runners 46 is connected to the sprue 44. The four plastic lenses 42 are connected to the four respective runners 46. However, the runner system 40 may be broken as operational errors may occur unexpectedly when the runner system 40 is pushed out of the injection mold. Typically, when the runner system 40 is broken, the sprue 44 of the broken runner system 40 remains in the injection mold. And it is well known to be very difficult to remove the sprue 44 of the broken runner system 40 from the injection mold.

Therefore, what is needed, is a removing device which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiment of the removing device will now be described in detail below and with reference to the drawings.

Figure 1:
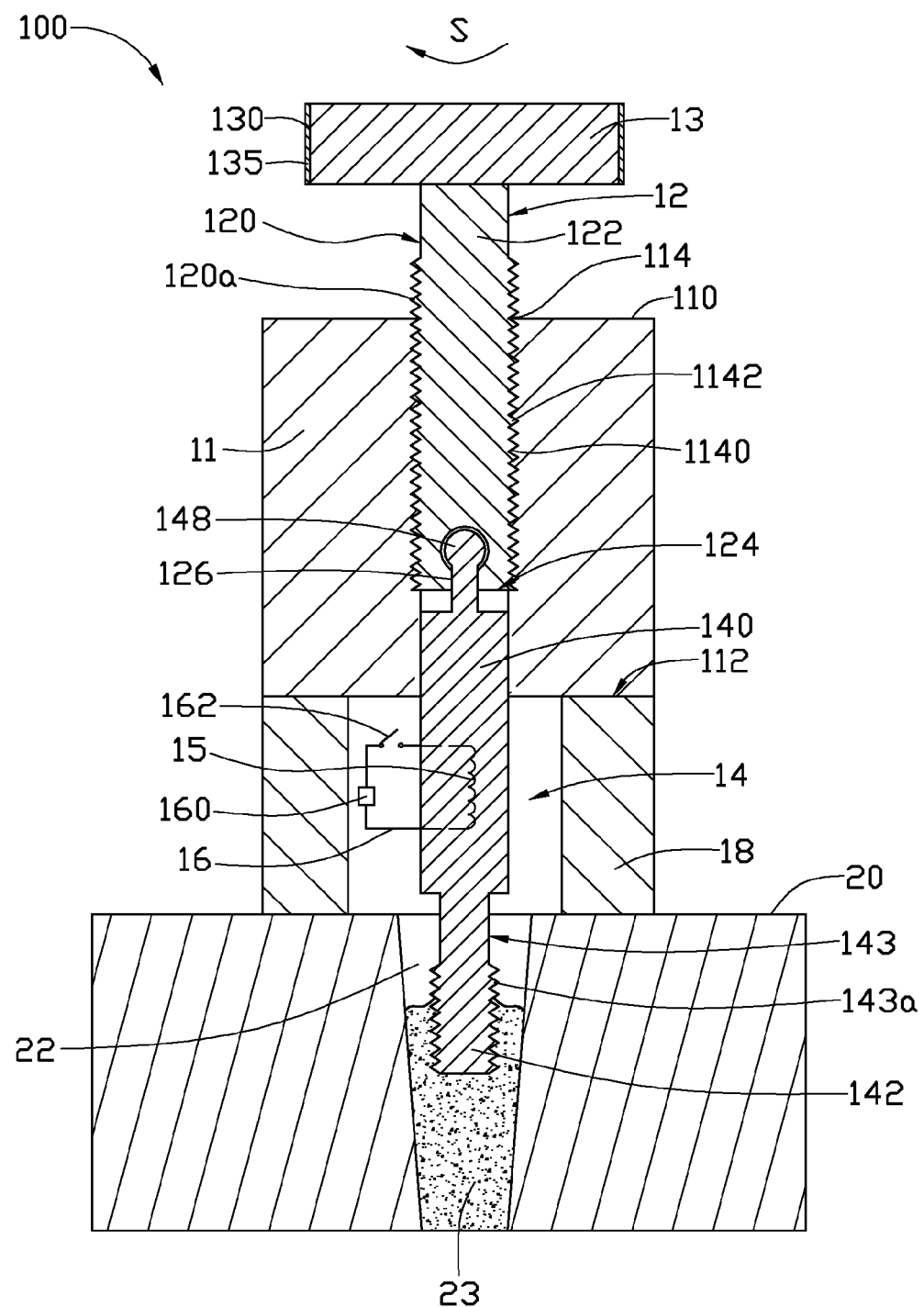
FIG. 1 is a sectional view of a removing device in accordance with an exemplary embodiment.

Referring to FIG. 1, a removing device 100 in accordance with an exemplary embodiment is shown. The removing device 100 includes a fixture 11, an arm 12, a rotatable head 13, a heating rod 14, a heater 15, and a circuit 16.

In this embodiment, the fixture 11 is substantially cylindrical, and includes a top surface 110 and a bottom surface 112 at opposite sides thereof. Alternatively, the fixture 11 may be substantially cuboid-shaped. The fixture 11 has a hole 114 defined in the top surface 110. The hole 114 is substantially cylindrical, and extends all the way through the bottom surface 112. The fixture 11 includes an inner sidewall 1140 in the hole 114. A portion of the inner sidewall 1140 close to the bottom surface 112 is smooth, and the other portion of the inner sidewall 1140 has first threads 1142 defined therein.

The arm 12 extends in a direction substantially parallel to the central axis (not shown) of the hole 114. In this embodiment, the arm 12 includes a first end 122 and an second end 124 opposite to the first end 122, and a first side surface 120 extending from the first end 122 to the second end 124. In addition, the arm 12 has second threads 120a defined in the first side surface 120. The second threads 120a is shaped to conform to the first threads 1142, thereby the arm 12 is threadedly engaged in the hole 114 through the engagement of the first threads 1142 with the second threads 120a. In this embodiment, the arm 12 can be made of heat insulation material such as a thermosetting phenol formaldehyde resin sold under the trademark Bakelite.

The rotatable head 13 is attached to the first end 122 of the arm 12, and protrudes from the top surface 110 of the fixture 11. In this embodiment, the rotatable head 13 is substantially cylindrical, and rotates the arm 12 relative to the fixture 11. A diameter of the rotatable head 13 is substantially greater than that of the arm 12. A rubber friction pad 135 can be provided and attached, or can be assembled to a second side surface 130 of the rotatable head 13. Thus, a user is able to easily grasp the rotatable head 13. When the rotatable head 13 rotates the arm 12, the arm 12 moves along the hole 114.

The heating rod 14 extends in a lengthwise direction of the arm 12. In this embodiment, the heating rod 14 includes a first portion 140, and a second portion 142 connected to the first portion 140. The first portion 140 includes a spherical shaped end 148. The second end 124 of the arm 12 has a groove 126 defined therein for receiving the spherical shaped end 148. Thus, the first portion 140 of the heating rod 14 is pivotedly coupled to the arm 12. In this embodiment, the first portion 140 is inserted in the hole 114 during movement of the arm 12, the smooth portion of the inner sidewall 1140 is used to guide the first portion 140 into the hole 114. The second portion 142 protrudes from the bottom surface 112.

The heating rod 14 can be made of metallic material such as copper, or another suitable metallic material. The heater 15 is coupled to the first portion 140, and heats the heating rod 14. In this embodiment, the heater 15 can be thermally resistant. The circuit 16 includes a power supply 160, a switch 162. The power supply 160 can be a battery pack. When the switch 162 is switched on, the power supply 160 supplies electric current to the heater 15, and the heater 15 heats the first portion 140.

In this embodiment, the second portion 142 and the first portion 140 are integrally connected to each other. A diameter of the second portion 142 is substantially smaller than that of the first portion 140. In alternative embodiments, the second portion 142 and the first portion 140 may be made separately and then attached to each other.

Figure 2:
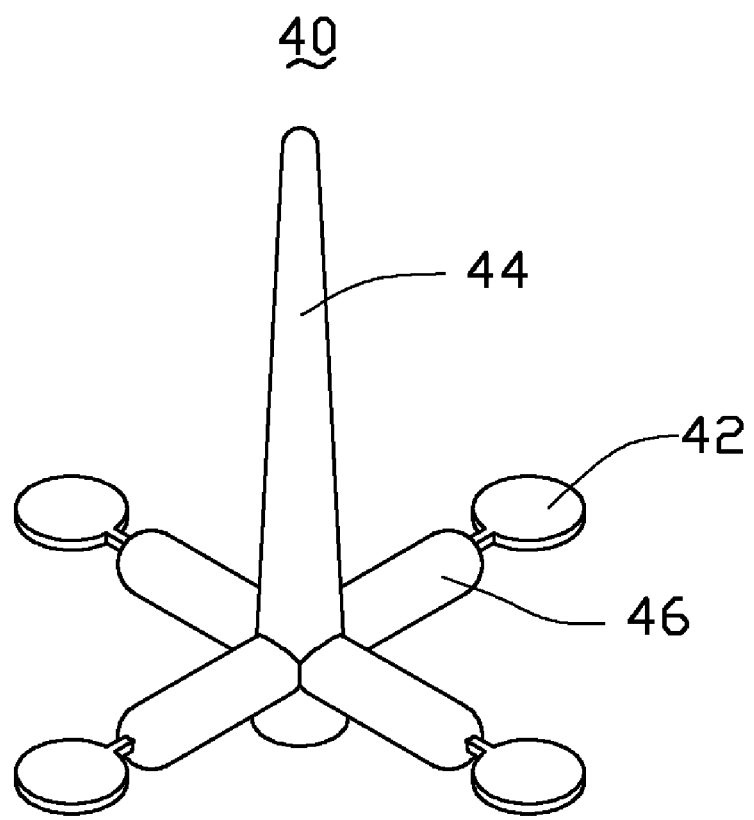
FIG. 2 is an isometric view of a typical runner system.

As referring also to FIG. 2, in operation, the removing device 100 removes a broken portion of a runner system 23 out of an injection mold 20. In this embodiment, the portion of the runner system 23 is received in a sprue 22 of the injection mold 20. The runner system 23 is generally made of plastic. In use, the fixture 11 can be arranged directly on the injection mold 20, with the second portion 142 of the heating rod 14 oriented toward the runner system 23. In this embodiment, the removing device 100 further includes a pedestal 18 for supporting the fixture 11. The pedestal 18 extends from the peripheral edge portion of the bottom surface 112, receives, and secures the second portion 142 of the heating rod 14.

In this embodiment, the pedestal 18 and the fixture 11 are made separately and then are attached to each other. In alternative embodiment, the pedestal 18 and the fixture 11 are integrally connected to each other.

In one example, the user rotates the rotatable head 13, as well as the arm 12 in a clockwise direction S as shown in FIG. 1, and the fixture 11 and the pedestal 18 is held stationary and relative to the injection mold 20. The first portion 140 and the heating rod 14 are moved towards the runner system 23 with a clockwise rotation of the rotatable head 13 and the arm 12.

When the heating rod 14 is moved to an extended position where the second portion 142 of the heating rod 14 contacts the runner system 23. The second portion 142 heats the runner system 23, until the plastic of the runner system 23 melts and the heating rod 14 is immersed in the heated plastic, the rotatable head 13 then stops rotating. Subsequently, the switch 142 is switched off, the heated plastic is solidified in the room temperature as the temperature of the plastic is cooled gradually. When the plastic is solidified, the heating rod 14 is attached to the runner system 23.

To remove the runner system 23 out of the injection mold 20, the rotatable head 13 can be rotated in a counter-clockwise direction. Accordingly, the heating rod 14 is move away from the injection mold 20 by a counter-clockwise rotation of the rotatable head 13. When the second portion 142 of the heating rod 14 is moved to a retracted position where the runner system 23 is away from the injection mold 20, the runner system 23 can be easily detached from the heating rod 14. In this embodiment, the heating rod 14 has third threads 143a defined in a third side surface 143 thereof, thereby the heating rod 14 can be attached to and engaged in the plastic material of the runner system 23 when the plastic is solidified. In addition, as the first portion 140 is pivotedly coupled to the arm 12, thus the heating rod 14 is moved away from the injection mold 20 without rotation. With this configuration, detachment of the runner system 23 from the heating rod 14 can be avoided when the runner system 23 is moved away from the injection mold 20.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A removing device comprising:
   a fixture comprising a top surface and a bottom surface opposite to the top surface, and defining a hole extending from the top surface to the bottom surface;
   an extendable and retractable arm threadedly engaged in the hole of the fixture;
   a heating rod coupled to an end of the arm, the heating rod comprising a first portion inserted in the hole and coupled to the arm, and a second portion protruding from the bottom surface;
   a heater coupled to the heating rod, the heater being configured for heating the heating rod; and
   a rotatable head coupled to another end of the arm distant from the heating rod and protruding from the top surface of the fixture, the rotatable head capable of rotating relative to the fixture to move the heating rod between an extended position where the second portion of the heating rod heats a base material of a broken portion of a runner system, the broken portion of the runner system being received in a sprue of an injection mold, the heated base material being solidified to engage with the second portion, and a retracted position where the broken portion of the runner system is moved away from the injection mold.

2. The removing device of claim 1, wherein the first portion of the heating rod is pivotedly coupled to the arm.

3. The removing device of claim 2, wherein the first portion of the heating rod comprises a spherical shaped end, the arm has a groove defined therein receiving the spherical shaped end.

4. The removing device of claim 1, further comprising a pedestal extending from a peripheral edge portion of the bottom surface, the pedestal being configured for arranging on the injection mold to support the fixture and securing the second portion of the heating rod.

5. The removing device of claim 4, wherein the pedestal and the fixture are integrally connected to each other.

6. The removing device of claim 1, wherein the heater comprises a thermal resistance, and the removing device comprises a circuit electrically connected to the heater, the circuit being configured for applying electric current to the heater.

7. The removing device of claim 1, wherein the second portion of the heating rod comprises a thread defined in a side surface thereof.

8. The removing device of claim 1, wherein the arm is made of a thermosetting phenol formaldehyde resin.

9. The removing device of claim 1, wherein the heating rod is made of copper.

10. The removing device of claim 1, further comprising a rubber friction pad, the rubber friction pad being attached to a side surface of the rotatable head.

11. The removing device of claim 1, wherein a diameter of the rotatable head is substantially greater than that of the arm.

12. A removing device comprising:
    a fixture comprising a top surface and a bottom surface opposite to the top surface, and defining a hole extending from the top surface to the bottom surface, an inner sidewall of the hole defining first threads;
    an extendable and retractable arm partially received in the hole and defining second threads in a side surface thereof, the arm capable of moving along the hole through the engagement of the first threads with the second threads;
    a heating rod coupled to an end of the arm, the heating rod comprising a first portion received in the hole and coupled to the arm, and a second portion protruding out of the hole; and
    a heater coupled to the heating rod and configured for heating the heating rod.

* * * * *